United States Patent
Ue

(10) Patent No.: US 7,348,571 B2
(45) Date of Patent: Mar. 25, 2008

(54) SCANNING MECHANISM FOR SCANNING PROBE MICROSCOPE AND SCANNING PROBE MICROSCOPE

(75) Inventor: Yoshihiro Ue, Hidaka (JP)

(73) Assignee: Olympus Corporation, Tokyo (JP)

( * ) Notice: Subject to any disclaimer, the term of this patent is extended or adjusted under 35 U.S.C. 154(b) by 308 days.

(21) Appl. No.: 11/262,537

(22) Filed: Oct. 28, 2005

(65) Prior Publication Data

US 2006/0108523 A1    May 25, 2006

(30) Foreign Application Priority Data

Nov. 1, 2004  (JP) .............................. 2004-318352

(51) Int. Cl.
G21K 5/10  (2006.01)
G02B 21/26  (2006.01)
H01J 37/20  (2006.01)

(52) U.S. Cl. ..................... 250/442.11; 250/440.11; 250/309; 250/306

(58) Field of Classification Search ............ None
See application file for complete search history.

(56) References Cited

U.S. PATENT DOCUMENTS 6,346,710 B1 * 2/2002 Ue ................. 250/442.11
6,617,761 B2   9/2003 Ando et al.
6,809,306 B2  10/2004 Ando et al.
2007/0114441 A1 * 5/2007 Ue ................. 250/440.11

FOREIGN PATENT DOCUMENTS

JP   2001-330425 A   11/2001
WO  WO 02/057749 A1   7/2002

* cited by examiner

Primary Examiner—Nikita Wells
(74) Attorney, Agent, or Firm—Frishauf, Holtz, Goodman & Chick, P.C.

(57) ABSTRACT

A scanning probe microscope scanning mechanism has a Z stage for moving an object to be moved along the Z-axis. The Z stage includes an insulating board, a Z-direction moving actuator fixed to the insulating board, wires for the application of a voltage to the Z-direction moving actuator, and electrical connecting portions for electrically connecting the wires to the Z-direction moving actuator. The Z-direction moving actuator has a piezoelectric element that can expand and contract along the X-axis. The object is mounted on the free end of the piezoelectric element. The electrical connecting portions are provided at the fixed end of the piezoelectric element.

14 Claims, 11 Drawing Sheets

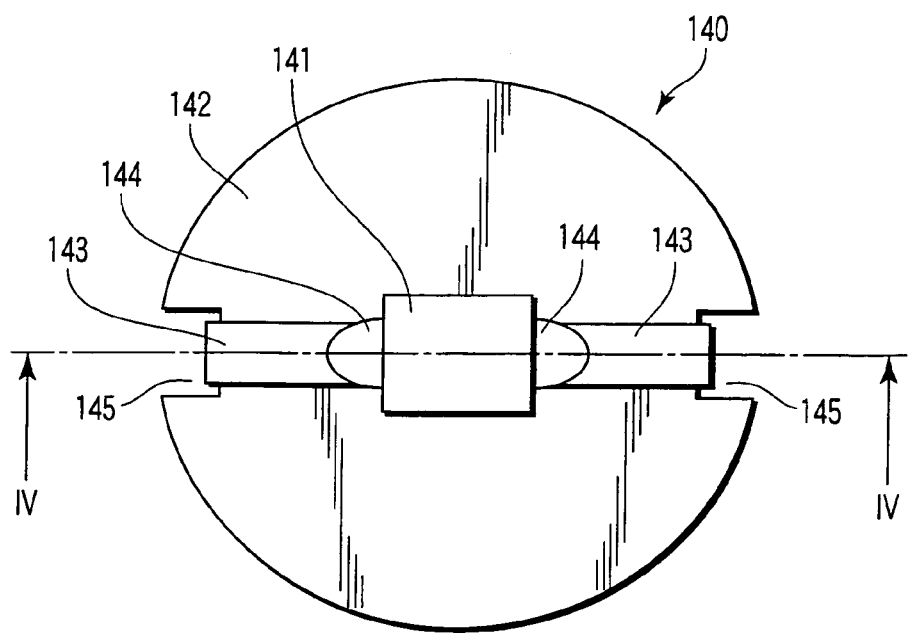
F I G. 3
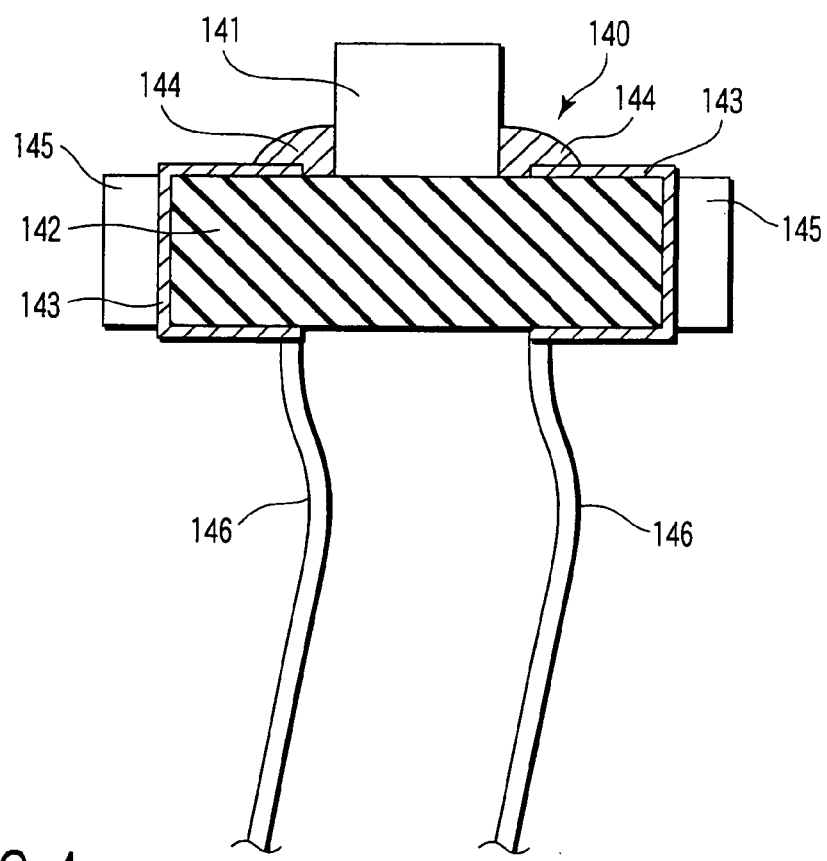
F I G. 4

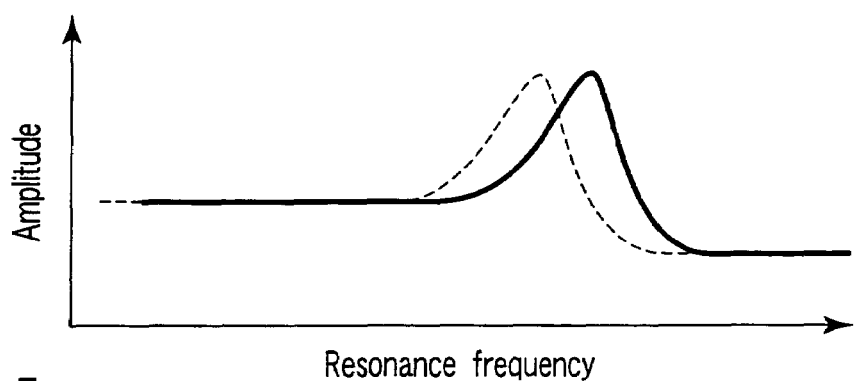
F I G. 5
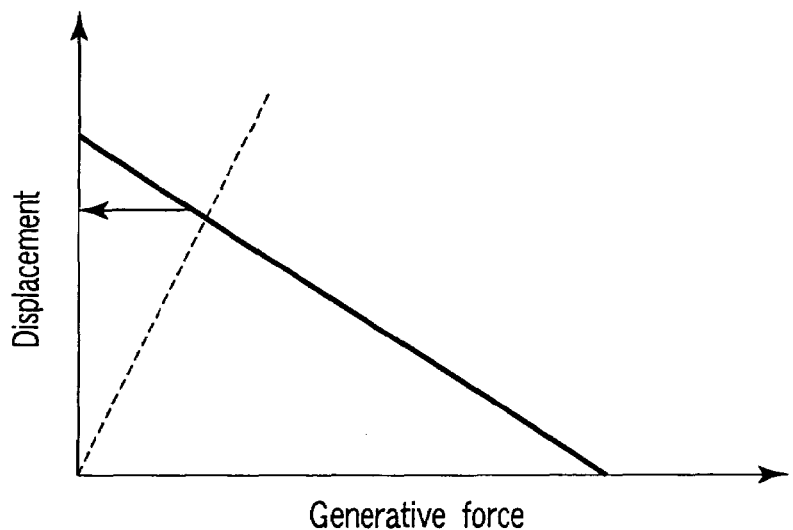
F I G. 6
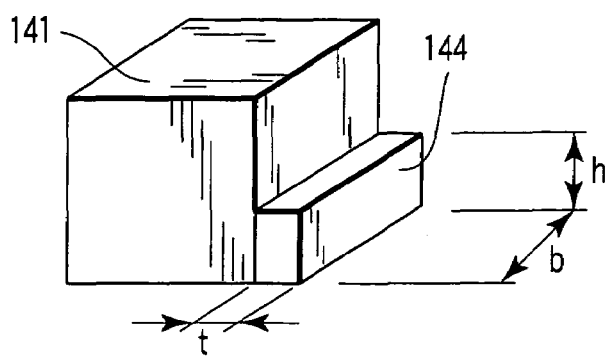
F I G. 7

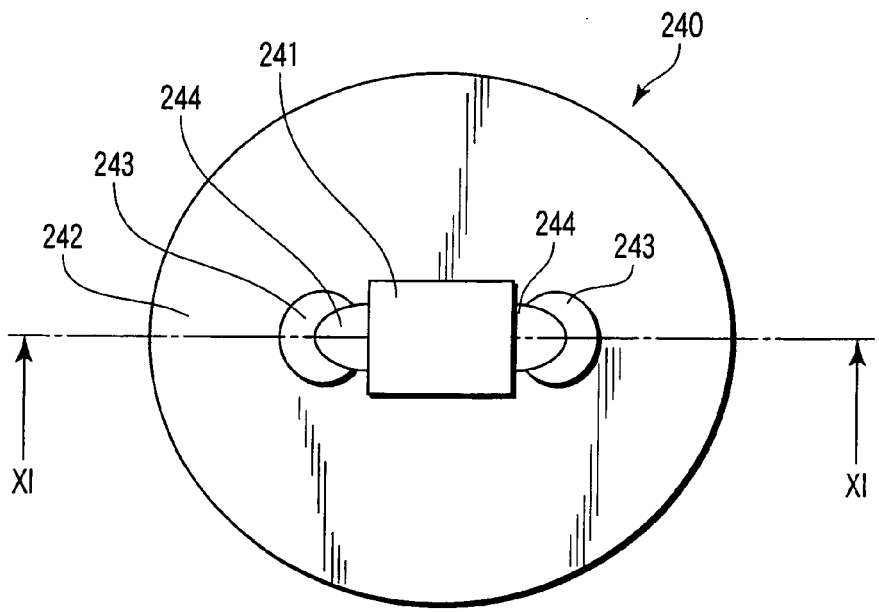
F I G. 10
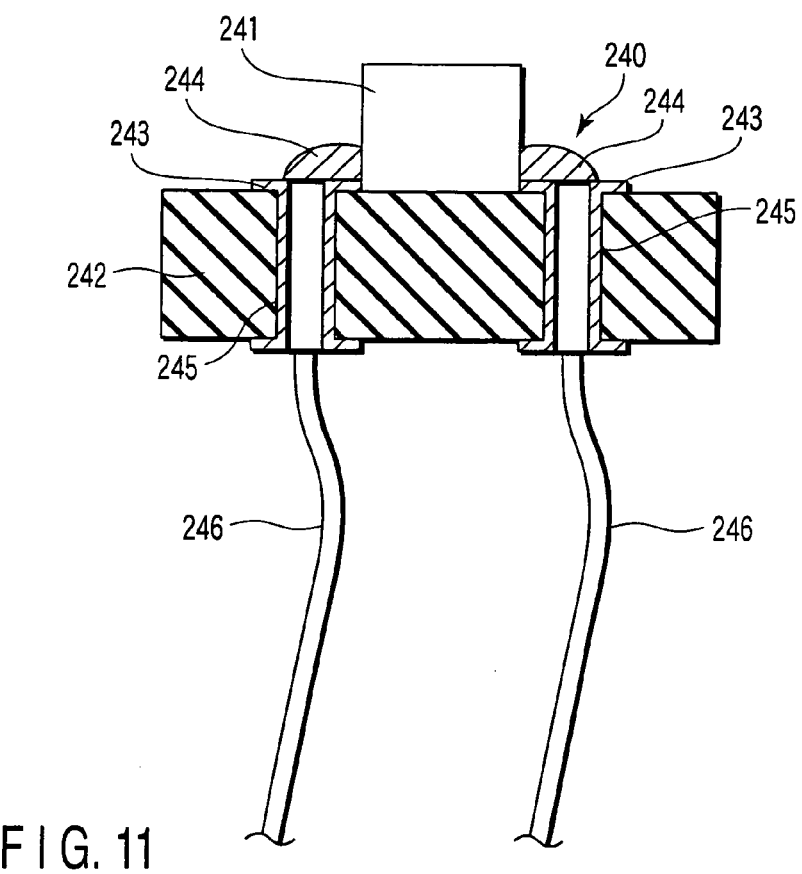
F I G. 11

SCANNING MECHANISM FOR SCANNING PROBE MICROSCOPE AND SCANNING PROBE MICROSCOPE

CROSS-REFERENCE TO RELATED APPLICATIONS

This application is based upon and claims the benefit of priority from prior Japanese Patent Application No. 2004-318352, filed Nov. 1, 2004, the entire contents of which are incorporated herein by reference.

BACKGROUND OF THE INVENTION

1. Field of the Invention

The present invention relates to a scanning mechanism for moving an object to be moved in a scanning microscope.

2. Description of the Related Art

As an apparatus using a scanning mechanism, a scanning probe microscope is available. A scanning probe microscope (SPM) is a scanning microscope that obtains the information of a sample surface by mechanically scanning a probe, i.e., a mechanical probe, and includes, for example, a scanning tunneling microscope (STM), atomic force microscope (AFM), scanning magnetic force microscope (MFM), scanning capacitance microscope (SCaM), scanning near-field optical microscope (SNOM), and scanning thermal microscope (SThM).

Recently, for example, a nanoindentator designed to check the hardness and the like of a sample by pressing a diamond probe against the sample surface to make an indentation and analyzing how the indentation is formed has been regarded as one of these SPMs, and has been widely used together with the above various kinds of microscopes.

A scanning probe microscope obtains surface information on a desired sample region through the probe by making a scanning mechanism relatively scan (e.g., raster-scan) the mechanical probe and the sample in the X and Y directions. During X-Y scanning, the scanning mechanism relatively moves the mechanical probe and the sample in the Z direction as well while performing feedback control so as to, for example, stabilize the interaction between the mechanical probe and the sample. Movement in the Z direction reflects the surface configuration and/or surface condition of the sample, and hence is irregular movement, which is generally called scanning operation in the Z direction, unlike regular movement in the X and Y directions. Scanning in the Z direction is operation at the highest frequency in the X, Y, and Z directions.

The scanning frequency of the scanning probe microscope in the X direction is approximately 0.05 to 200 Hz, and the scanning frequency in the Y direction is a fraction of the number of scanning lines in the Y direction of the scanning frequency in the X direction. The number of scanning lines in the Y direction is 10 to 1,000. In addition, the scanning frequency in the Z direction ranges from a frequency corresponding to the number of pixels per line in X-direction scanning to a frequency approximately 100 times the frequency in the X scanning direction.

When, for example, an image with 100 pixels in the X direction and 100 pixels in the Y direction is to be captured in one sec, the scanning frequency in the X direction is 100 Hz; the scanning frequency in the Y direction, 1 Hz; and the scanning frequency in the Z direction, 10 kHz. A scanning mechanism that realizes this speed is proposed in, for example, Jpn. Pat. Appln. KOKAI Publication No. 2001-330425.

Recently, there has been a requirement that images be observed at the video rate. In this case, the scanning frequency required for a piezoelectric element in the Z direction is 300 kHz or more. According to the scanning mechanism disclosed in Jpn. Pat. Appln. KOKAI Publication No. 2001-330425, a Z-direction moving actuator in charge of Z scanning comprises a stacked piezoelectric element. In order to obtain a scanning frequency of 300 kHz or more, a stacked piezoelectric element has, for example, a cubic shape with an edge of approximately 2 mm, which is very small. The stacked piezoelectric element has a very small mass of 1 g or less.

The stacked piezoelectric element is driven by application of a voltage, and hence generally two wires are connected to the element. In general, the connection of wires to the stacked piezoelectric element is performed by soldering. The connection of wires by soldering poses no serious problem with respect to a relatively large stacked piezoelectric element. However, this connection sometimes affects the displacement characteristic of a very small stacked piezoelectric element with an edge of approximately 2 mm.

In this case, a stacked piezoelectric element is exemplified. However, the piezoelectric element to be used is not limited to a stacked piezoelectric element. The same applies to a cylindrical piezoelectric element, for example, and piezoelectric elements in general.

BRIEF SUMMARY OF THE INVENTION

The present invention is directed to a scanning probe microscope scanning mechanism for moving an object to be moved along an X-axis, a Y-axis, and a Z-axis that are perpendicular to each other. The scanning mechanism comprises a Z stage to move the object along the Z-axis, the Z stage having an insulating board, a Z-direction moving actuator fixed to the insulating board, wires to apply a voltage to the Z-direction moving actuator, and electrical connecting portions to electrically connect the wires to the Z-direction moving actuator, the Z-direction moving actuator having a piezoelectric element that can expand and contract along the Z-axis, the object being mounted on a free end of the piezoelectric element, and the electrical connecting portions being provided at a fixed end of the piezoelectric element.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a top view of a Z stage shown in FIGS. 1 and 2;

FIG. 4 is a sectional view taken along a line IV-IV of the Z stage shown in FIG. 3;

FIG. 5 is a graph showing the relationship between the frequency of an applied signal and the displacement of a stacked piezoelectric element;

FIG. 6 is a graph showing the relationship between the generative force and the displacement of a piezoelectric element without any displacement constraint;

FIG. 7 shows a model in which a rectangular parallelepiped electrical connecting portion is formed on a side surface of a Z-direction moving piezoelectric element;

FIG. 10 is a top view of a Z stage shown in FIGS. 8 and 9;

FIG. 11 is a sectional view taken along a line XI-XI of the Z stage shown in FIG. 10;

DETAILED DESCRIPTION OF THE INVENTION

The embodiments of the present invention will be described below with reference to the views of the accompanying drawing.

First Embodiment

This embodiment is directed to a scanning mechanism for a scanning probe microscope. This embodiment will be described with reference to FIGS. 1 to 7.

Figure 1:
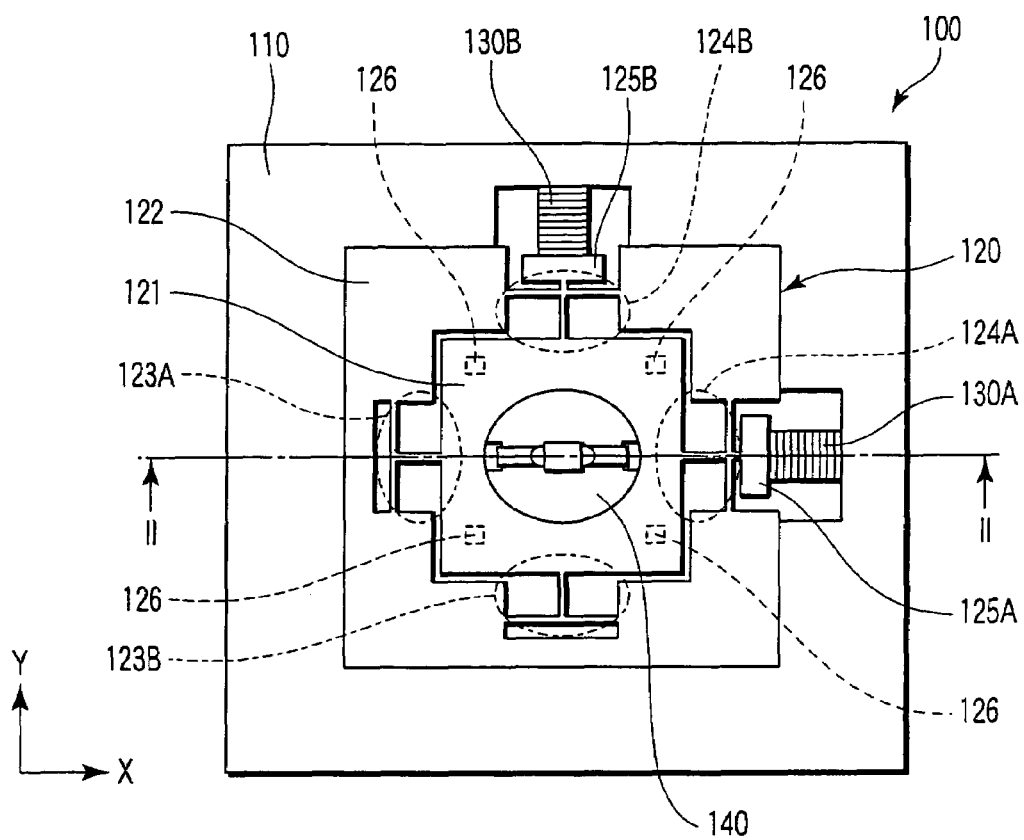
FIG. 1 is a top view of a scanning mechanism according to the first embodiment of the present invention.
Figure 2:
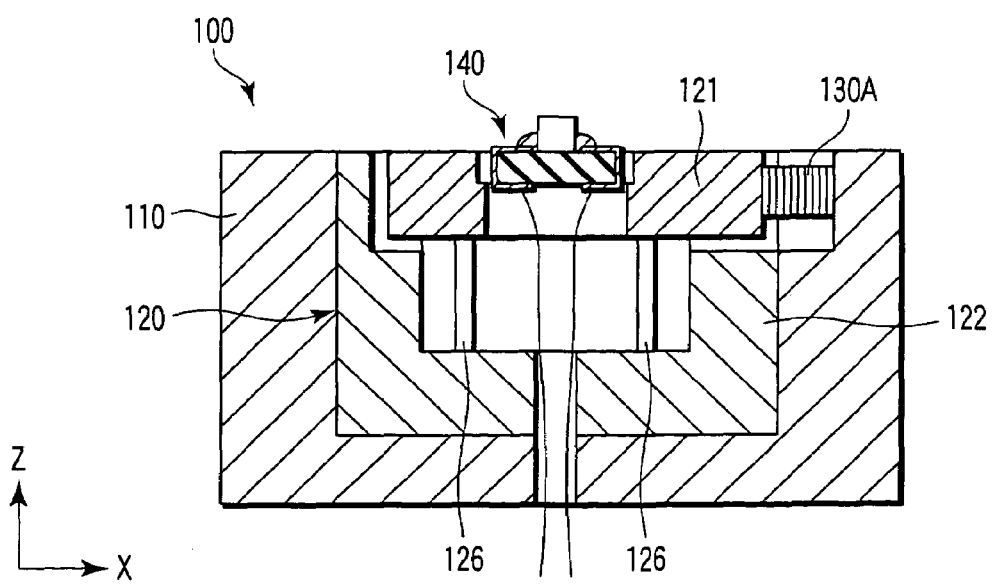
FIG. 2 is a sectional view taken along a line II-II of the scanning mechanism shown in FIG. 1.

FIG. 1 is a top view of a scanning mechanism according to the first embodiment of the present invention. FIG. 2 is a sectional view taken along a line II-II of the scanning mechanism in FIG. 1.

As shown in FIGS. 1 and 2, a scanning mechanism 100 of this embodiment has three axes that are perpendicular to each other, i.e., the X-axis, Y-axis, and Z-axis, and comprises a fixed base 110, an X-Y stage 120 housed in the fixed base 110, an X-direction moving actuator 130A that extends along the X-axis between the X-Y stage 120 and the fixed base 110, and a Y-direction moving actuator 130B that extends along the Y-axis between the X-Y stage 120 and the fixed base 110.

The X-Y stage 120 includes a movable portion 121 that is moved along the X- and Y-axes, a fixed portion 122 located around the movable portion 121, a pair of first elastic support portions 123A and 124A that are located on both sides of the movable portion 121 along the X-axis and connect the movable portion 121 and the fixed portion 122, a press portion 125A that is provided for the first elastic support portion 124A located on the X-direction moving actuator 130A side and is pressed by the X-direction moving actuator 130A, a pair of second elastic support portions 123B and 124B that are located on both sides of the movable portion 121 along the Y-axis and connect the movable portion 121 and the fixed portion 122, a press portion 125B that is provided for the second elastic support portion 124B located on the Y-direction moving actuator 130B side and is pressed by the Y-direction moving actuator 130B, and four third elastic support portions 126 that are located on one side of the movable portion 121 along the Z-axis, i.e., below the movable portion 121, and connect the movable portion 121 and the fixed portion 122.

The fixed portion 122 of the X-Y stage 120 is fixed to the fixed base 110 by screwing or using an adhesive, although not limited to this.

The first elastic support portions 123A and 124A and the second elastic support portions 123B and 124B each have a T shape. The first elastic support portions 123A and 124A individually have a leaf spring portion extending on a Z-X plane and a leaf spring portion extending on a Y-Z plane. The second elastic support portions 123B and 124B individually have a leaf spring portion extending on the Y-Z plane and a leaf spring portion extending along the Z-X plane.

More specifically, the first elastic support portions 123A and 124A individually have a rectangular leaf spring portion that expands on the Z-X plane and is elongated along the X-axis and a rectangular leaf spring portion that expands on the Y-Z plane and is elongated along the Y-axis. The rectangular leaf spring portion that is elongated along the X-axis has one end portion along the X-axis that is continuous with the movable portion 121 and the other end portion along the X-axis that is continuous with the middle portion of the rectangular leaf spring portion that is elongated along the Y-axis. The rectangular leaf spring portion that is elongated along the Y-axis has two end portions along the Y-axis that are continuous with the fixed portion 122. The thicknesses of these leaf spring portions, i.e., the dimensions along the Z-axis, are both equal to the thickness of the movable portion 121.

The second elastic support portions 123B and 124B have the same form as that of the first elastic support portions 123A and 124A except that their directions differ by 90°.

Owing to this form, the first elastic support portions 123A and 124A easily elastically deform along the Y-axis, but do not easily elastically deform along the X-axis. The second elastic support portions 123B and 124B easily elastically deform along the X-axis, but do not easily elastically deform along the Y-axis. The third elastic support portions 126 easily elastically deform along both the X-axis and the Y-axis, but do not easily elastically deform along the Z-axis.

The movable portion 121 is therefore supported with high rigidity in the direction along the X-axis by the first elastic support portions 123A and 124A, is supported with high rigidity in the direction along the Y-axis by the second elastic support portions 123B and 124B, and is supported with high rigidity in the direction along the Z-axis by the third elastic support portions 126.

The press portion 125A has a rectangular parallelepiped block portion and a coupling portion that couples the block portion to the first elastic support portion 124A. The block portion has a large size along the X-axis and does not substantially elastically deform. The coupling portion has one end portion continuous with the middle portion of the block portion and the other portion continuous with the middle portion of the rectangular leaf spring portion of the first elastic support portion 124A that is elongated along the Y-axis. The coupling portion extends along the X-axis but has a small size along the X-axis. This portion does not substantially elastically deform. The thicknesses of the block portion and coupling portion, i.e., the sizes along the Z-axis, are both equal to the thickness of the movable portion 121.

The press portion 125B has the same form as that of the press portion 125A except that their directions differ by 90°.

The third elastic support portions 126 are symmetrically positioned with respect to a straight line that passes through the center of gravity of the movable portion 121 and is parallel to the Z-axis. For example, each of the third elastic support portions 126 has a rod-like shape and extends parallel to the Z-axis.

The third elastic support portions 126 are located at equal distances from the center of gravity of the movable portion 121 and are evenly arranged with respect to the straight line that passes through the center of gravity of the movable portion 121 and is parallel to the Z-axis. That is, the centers of the third elastic support portions 126 are positioned at angular intervals of 90° on the circumference of a circle having a center that is on the straight line that passes through the center of gravity of the movable portion 121 and is parallel to the Z-axis.

Preferably, the movable portion 121, fixed portion 122, first elastic support portions 123A and 124A, second elastic support portions 123B and 124B, and third elastic support portions 126 are integrally formed. For example, the X-Y stage 120 is formed by selectively notching an integral part, e.g., a block made of a metal such as aluminum.

The material of the fixed base 110 may be the same as that of the X-Y stage 120. More preferably, this material has a Young's modulus higher than the material of the X-Y stage 120. For example, the X-Y stage 120 is of aluminum, and the fixed base 110 is of stainless steel.

The X-direction moving actuator 130A is placed to apply a predetermined preload between the press portion 125A and the fixed base 110. For example, the X-direction moving actuator 130A is a stacked piezoelectric element, and expands and contracts along the X-axis in accordance with the applied voltage. The Y-direction moving actuator 130B is placed to apply a predetermined preload between the press portion 125B and the fixed base 110. For example, the Y-direction moving actuator 130B is a stacked piezoelectric element, and expands and contracts along the Y-axis in accordance with the applied voltage.

The central axis of the X-direction moving actuator 130A, i.e., a straight line that passes through the center of the X-direction moving actuator 130A and is parallel to the X-axis, passes through the center of gravity of the movable portion 121. Likewise, the central axis of the Y-direction moving actuator 130B, i.e., a straight line that passes through the center of the Y-direction moving actuator 130B and is parallel to the Y-axis, passes through the center of gravity of the movable portion 121.

The scanning mechanism 100 further includes a Z stage 140 for moving an object to be moved along the Z-axis. The movable portion 121 has a through hole with a stepped portion. The Z stage 140 is housed in the large-diameter portion of the through hole in the movable portion 121 and is supported by the stepped portion.

FIG. 3 is a top view of the Z stage shown in FIGS. 1 and 2. FIG. 4 is a sectional view taken along a line IV-IV of the Z stage shown in FIG. 3.

As shown in FIGS. 3 and 4, the Z stage 140 includes an insulating board 142 housed in the large-diameter portion of the through hole in the movable portion 121, a Z-direction moving piezoelectric element 141 constituting a Z-direction moving actuator, a pair of conductive patterns 143 provided for the insulating board 142, wires 146 electrically connected to the conductive patterns 143, respectively, and electrical connecting portions 144 electrically connecting the Z-direction moving piezoelectric element 141 to the conductive patterns 143.

The Z-direction moving piezoelectric element 141 is mechanically fixed on the upper surface of the insulating board 142 with an adhesive or the like, and extends upward from the insulating board 142 along the Z-axis. An object to be moved is mounted on the free end of the Z-direction moving piezoelectric element 141. The object is, for example, a sample to be observed. In another case, the object is a cantilever. The Z-direction moving piezoelectric element 141 may have a weight of 1 [g] or less. The Z-direction moving piezoelectric element 141 comprises, for example, a stacked piezoelectric element, and expands and contracts along the Z-axis in accordance with the applied voltage. The central axis of the Z-direction moving piezoelectric element 141 passes through the center of gravity of the movable portion 121.

The insulating board 142 has a pair of notches 145 formed on both sides along the X-axis. Each of the conductive patterns 143 extends, from near the fixed end of the Z-direction moving piezoelectric element 141, on the upper surface of the insulating board 142 outward along the X-axis, so as to extend from the upper surface of the insulating board 142 to the lower surface through the notch 145, and extends on the lower surface of the insulating board 142 along the X-axis. The electrical connecting portions 144 are provided at the lower end, i.e., the fixed end, of the Z-direction moving piezoelectric element 141, and are in contact with the Z-direction moving piezoelectric element 141 and the conductive patterns 143. The electrical connecting portions 144 individually may be, for example, a conductive paste, a conductive adhesive, an extra fine wire such as a bonding wire, or solder that melts at a low temperature. In addition, the electrical connecting portions 144 individually may be coated with graphite.

The wires 146 are connected to the conductive patterns 143 on the lower surface side of the insulating board 142. The Z-direction moving piezoelectric element 141 is electrically connected to the wires 146 through the electrical connecting portions 144 and the conductive patterns 143.

Portions to which a voltage is applied, such as the conductive patterns 143 and electrical connecting portions 144, are preferably coated with insulating films to prevent electrical leak and electrical shock.

In the scanning mechanism 100, an object to be moved is mounted on the free end of the Z-direction moving piezoelectric element 141.

At the time of X scanning, the X-direction moving actuator 130A expands and contracts along the X-axis. Since one end of the X-direction moving actuator 130A is fixed to the fixed base 110, expansion/contraction of the X-direction moving actuator 130A is reflected in the displacement of the free end of the X-direction moving actuator 130A along the X-axis.

The expansion of the X-direction moving actuator 130A, i.e., the displacement of the free end in the −X direction, displaces the press portion 125A in the −X direction. When the X-direction moving actuator 130A expands, a reaction force accompanying the elastic deformation of the first elastic support portions 123A and 124A and of the second elastic support portions 123B and 124B acts on the portion of the fixed base 110 to which the X-direction moving actuator 130A is fixed. However, since the fixed base 110 is made of a material having a high Young's modulus and undergoes little deformation, most of the displacement of the free end of the X-direction moving actuator 130A is transferred to the press portion 125A.

The displacement of the press portion 125A is transferred to the movable portion 121 through the first elastic support portion 124A. Since the leaf spring portion of the first elastic support portion 124A that extends along the X-axis has high rigidity in the X direction, the displacement of the press portion 125A is transferred to the movable portion 121. On the other hand, the leaf spring portions of the first elastic support portions 123A and 124A that extend along the Y-axis have low rigidity in the X direction, and hence do not hinder the displacement of the movable portion 121 along the X-axis. In addition, the leaf spring portions of the second elastic support portions 123B and 124B that extend along the Y-axis have low rigidity in the X direction, and hence do not hinder the displacement of the movable portion 121 along the X-axis. Furthermore, the third elastic support portions 126 that support the movable portion 121 in the Z direction with high rigidity have low rigidity in the X and Y directions, and hence do not hinder the displacement of the movable portion 121 along the X-axis.

Therefore, the movable portion 121 is moved in the −X direction in accordance with the expansion of the X-direction moving actuator 130A, i.e., the displacement of the free end in the −X direction.

The contraction of the X-direction moving actuator 130A, i.e., the displacement of the free end in the +X direction, reduces the hindrance to the restoration of the first elastic support portions 123A and 124A and second elastic support portions 123B and 124B that are in elastic deformation. Along with this displacement, the first elastic support portions 123A and 124A and the second elastic support portions 123B and 124B become closer to their original shapes, and hence the movable portion 121 is moved in the +X direction.

As a result, with expansion/contraction of the X-direction moving actuator 130A, i.e., the displacement of the free end in the ±X direction, the movable portion 121 is moved in the ±X direction.

At the time of Y scanning, the Y-direction moving actuator 130B expands and contracts along the Y-axis. For the same reason as that described above, expansion/contraction of the Y-direction moving actuator 130B is reflected in the displacement of the free end of the Y-direction moving actuator 130B along the Y-axis.

The expansion of the Y-direction moving actuator 130B, i.e., the displacement of the free end in the −Y direction, displaces the press portion 125B in the −Y direction. For the same reason as that described above, most of the displacement of the free end of the Y-direction moving actuator 130B is transferred to the press portion 125B.

The displacement of the press portion 125B is transferred to the movable portion 121 through the second elastic support portion 124B. For the same reason as that described above, while the second elastic support portion 124B transfers the displacement of the press portion 125B to the movable portion 121, the first elastic support portions 123A and 124A, the second elastic support portions 123B and 124B, and the third elastic support portions 126 do not hinder the displacement of the movable portion 121 along the Y-axis.

Therefore, the movable portion 121 is moved in the −Y direction in accordance with the expansion of the Y-direction moving actuator 130B, i.e., the displacement of the free end in the −Y direction.

The contraction of the Y-direction moving actuator 130B, i.e., the displacement of the free end in the +Y direction, reduces the hindrance to the restoration of the first elastic support portions 123A and 124A and second elastic support portions 123B and 124B that are in elastic deformation. Along with this displacement, the first elastic support portions 123A and 124A and the second elastic support portions 123B and 124B become closer to their original shapes, and hence the movable portion 121 is moved in the +Y direction.

As a result, with expansion/contraction of the Y-direction moving actuator 130B, i.e., the displacement of the free end in the ±X direction, the movable portion 121 is moved in the ±Y direction.

At the time of such displacement of the movable portion 121 along the X- and Y-axes, since the first elastic support portions 123A and 124A are symmetrically arranged with respect to the Y-axis, and the second elastic support portions 123B and 124B are symmetrically arranged with respect to the X-axis, the movable portion 121 is linearly displaced without rotating within the X-Y plane. In addition, since the third elastic support portions 126 function as parallel springs, the movable portion 121 moves horizontally without tilting its upper surface with respect to the X-Y plane, that is, while keeping its upper surface parallel to the X-Y plane.

In addition, since the central axes of the X-direction moving actuator 130A and Y-direction moving actuator 130B pass through the center of gravity of the movable portion 121, even if the movable portion 121 is moved at a high speed, a rotational moment is hardly caused by an inertial force. For this reason, the movable portion 121 is displaced with high accuracy without rotating.

The expansion of the X-direction moving actuator 130A and the expansion of the Y-direction moving actuator 130B respectively displace the first elastic support portions 123A and 124A and the second elastic support portions 123B and 124B. As a consequence, reaction forces due these displacements respectively act on the portions of the fixed base 110 at which the X-direction moving actuator 130A and the Y-direction moving actuator 130B are respectively fixed. Since the Young's modulus of the material of the fixed base 110 is higher than that of the material of the X-Y stage 120, the fixed base 110 undergoes small displacement. For this reason, the expansion, i.e., the displacement, of the X-direction moving actuator 130A and Y-direction moving actuator 130B is efficiently transferred to the press portions 125A and 125B.

At the time of Z scanning, the Z-direction moving piezoelectric element 141 expands and contracts along the Z-axis. Since the lower end of the Z-direction moving piezoelectric element 141 is fixed to the insulating board 142, the expansion/contraction of the Z-direction moving piezoelectric element 141 is reflected in the displacement of the free end of the Z-direction moving piezoelectric element 141 along the Z-axis. An object to be moved that is mounted on the free end of the Z-direction moving piezoelectric element 141 is moved in the ±Z direction in accordance with the expansion/contraction of the Z-direction moving piezoelectric element 141, i.e., the displacement of the free end in the ±Z direction.

Since the central axis of the Z-direction moving piezoelectric element 141 passes through the center of gravity of the movable portion 121, and the third elastic support portions 126 are symmetrically arranged with respect to the straight line that passes through the center of gravity of the movable portion 121 and is parallel to the Z-axis, even if the Z-direction moving piezoelectric element 141 is driven at a high speed, the upper surface of the movable portion 121 hardly tilts. This can realize high-accuracy operation.

As a method of evaluating the scanning speed of the Z-direction moving piezoelectric element 141, there is available a method of checking the relationship between the frequency of a signal applied to the Z-direction moving piezoelectric element 141 and the displacement. As the frequency of a signal applied to the Z-direction moving piezoelectric element 141 is increased, there is a frequency at which the displacement is maximized. This frequency is a resonance frequency. In general, a higher resonance frequency allows scanning at a higher speed. The resonance frequency depends on the size and weight of the Z-direction moving piezoelectric element 141, and also depends on the Young's modulus of the insulating board 142 to which the Z-direction moving piezoelectric element 141 is fixed. As the Young's modulus of the insulating board 142 decreases, the resonance frequency decreases.

FIG. 5 is a graph showing the relationship between the frequency of an applied signal and the displacement of a stacked piezoelectric element. The abscissa and ordinate of the graph represent the frequency of an applied signal and the displacement of the stacked piezoelectric element, respectively. In the graph of FIG. 5, the broken line represents the displacement characteristic of the stacked piezoelectric element in which the insulating board 142 is made of a material having a low Young's modulus, e.g., a resin. The solid line represents the displacement characteristic of the stacked piezoelectric element in which the insulating board 142 is made of a material having a high Young's modulus, e.g., a ceramic material such as alumina. As is obvious from the comparison between the two characteristics, the stacked piezoelectric element in which the insulating board 142 is made of a material having a higher Young's modulus has a higher resonance frequency, and hence can perform high-speed scanning.

More specifically, the insulating board 142 is preferably made of a material having a Young's modulus of $7 \times 10^9$ Pa, e.g., a ceramic material.

In general, wires for the application of a voltage to the stacked piezoelectric element are connected to the middle portion of a side surface of the stacked piezoelectric element by soldering. For this reason, the wires extend into a space near the stacked piezoelectric element. The stacked piezoelectric element therefore receives the load produced by the weight of the solder and the load produced by the weight of the wires extending from the solder into the space. These loads are negligibly small for a large stacked piezoelectric element, but are too large to be neglected for a very small stacked piezoelectric element having an edge of approximately 2 mm. That is, the loads may degrade the displacement characteristic.

In this embodiment, since the electrical connecting portions 144 provided at the lower end, i.e., the fixed end, of the Z-direction moving piezoelectric element 141 is in contact with the insulating board 142, the load produced by the weight of the connection portion is not applied to the Z-direction moving piezoelectric element 141. In addition, the wires 146 are connected to the conductive patterns 143 and are not connected to the Z-direction moving piezoelectric element 141, and hence the load produced by the weight of wires is not applied to the Z-direction moving piezoelectric element 141. Therefore, the Z-direction moving piezoelectric element 141 is free from deterioration in displacement characteristic due to the loads produced by the weights of the electrical connecting portions 144 and wires 146.

When soldering is performed, an object to be connected is heated at a high temperature. A very small stacked piezoelectric element has a small heat capacity. For this reason, when a very small stacked piezoelectric element is heated in soldering operation, the piezoelectric body of the stacked piezoelectric element is polarized. This may degrade the displacement characteristic.

In contrast to this, in this embodiment, since the electrical connecting portions 144 are individually formed from solder that melts at a low temperature or an extra fine wire such as a bonding wire, the heating of the Z-direction moving piezoelectric element 141 is suppressed, and hence the Z-direction moving piezoelectric element 141 is resistant to deterioration in displacement characteristic due to heating. More preferably, the electrical connecting portions 144 are formed from a material that can be worked without requiring heating, such as a conductive paste or a conductive adhesive, and hence the Z-direction moving piezoelectric element 141 is not heated. Therefore, the Z-direction moving piezoelectric element 141 is free from deterioration in displacement characteristic due to heating.

Furthermore, solder provided on a side surface of the stacked piezoelectric element constrains the stacked piezoelectric element. The constraint due to the solder may degrade the displacement characteristic of the stacked piezoelectric element.

In contrast to this, in this embodiment, since the electrical connecting portions 144 provided at the lower end, i.e., the fixed end, of the Z-direction moving piezoelectric element 141 are in contact with the insulating board 142, the contact areas between the electrical connecting portions 144 and the Z-direction moving piezoelectric element 141 are relatively small. The constraint of the Z-direction moving piezoelectric element 141 by the electrical connecting portions 144 is small, and hence deterioration in displacement characteristic due to the constraint of the Z-direction moving piezoelectric element 141 is suppressed small.

In general, the two ends of a piezoelectric element have portions that do not contribute to the generation of displacement. The electrical connecting portions 144 are preferably in contact with only the lower end portions of the Z-direction moving piezoelectric element 141 that do not contribute to the generation of displacement.

The electrical connecting portions 144 tend to extend over the lower end portions that do not contribute to the generation of displacement and come into contact with the piezoelectric element, although it depends on machining accuracy. In this case, the electrical connecting portions 144 may constrain the piezoelectric element and degrade the output displacement of the piezoelectric element. Therefore, the Young's modulus and contact state of the electrical connecting portions 144 must be taken into consideration.

In general, the generative force and the displacement of a piezoelectric element without any displacement constraint have the relationship represented by the solid line in FIG. 6. When an electrical connecting portion 144 acts as a displacement constraint member, the electrical connecting portion 144 generates a constraint force like that represented by the broken line in FIG. 6 as the Z-direction moving piezoelectric element 141 is displaced. For this reason, the maximum output displacement of the Z-direction moving piezoelectric element 141 decreases to the intersection of the solid line and the broken line. In general, a piezoelectric element that operates at a higher speed has a smaller output displacement. For this reason, a decrease in output displacement by the electrical connecting portion 144 is preferably suppressed to 10% or less. For this purpose, the electrical connecting portion 144 needs to be designed such that its displacement constraint force is 10% or less of the generative force of the Z-direction moving piezoelectric element 141.

For example, as shown in FIG. 7, the constraint force to be generated when the electrical connecting portion 144 is modeled into a rectangular parallelepiped member on a side surface of the Z-direction moving piezoelectric element 141 is roughly calculated. If the electrical connecting portion 144 is displaced by X upon displacement of the Z-direction moving piezoelectric element 141, a constraint force f generated by the electrical connecting portion 144 is approximately $$f = \frac{Ebt}{h} \times (E: \text{Young's modulus}). \quad (1)$$

If a Young's modulus and the dimensions of each portion are determined such that the constraint force f falls within 10% of the generative force of the Z-direction moving piezoelectric element 141, a decrease in displacement can be suppressed small.

For example, a conductive paste or a bonding wire has a low Young's modulus, and hence is suitable as the electrical connecting portion 144.

In this embodiment, the Z-direction moving piezoelectric element 141 comprises a stacked piezoelectric element. However, the present invention can also be applied to a case wherein the Z-direction moving piezoelectric element 141 comprises a cylindrical piezoelectric element.

Second Embodiment

This embodiment is directed to another scanning mechanism. The embodiment will be described below with reference to FIGS. 8 to 11.

Figure 8:
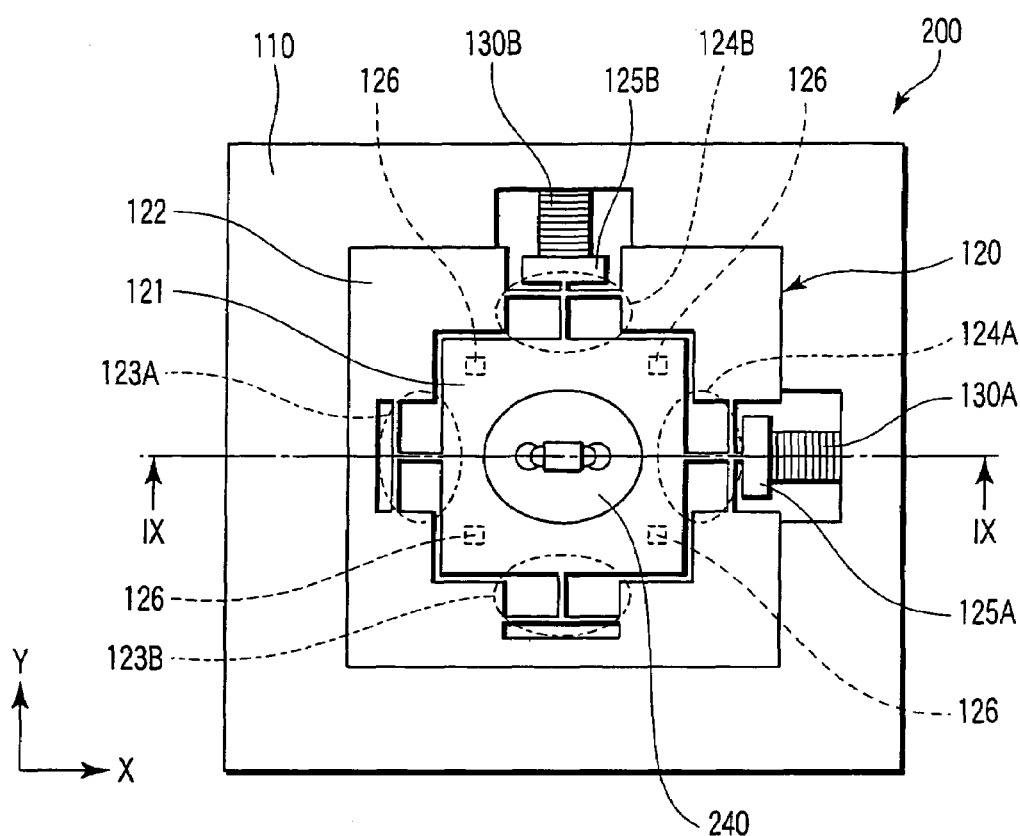
FIG. 8 is a top view of a scanning mechanism according to the second embodiment of the present invention.
Figure 9:
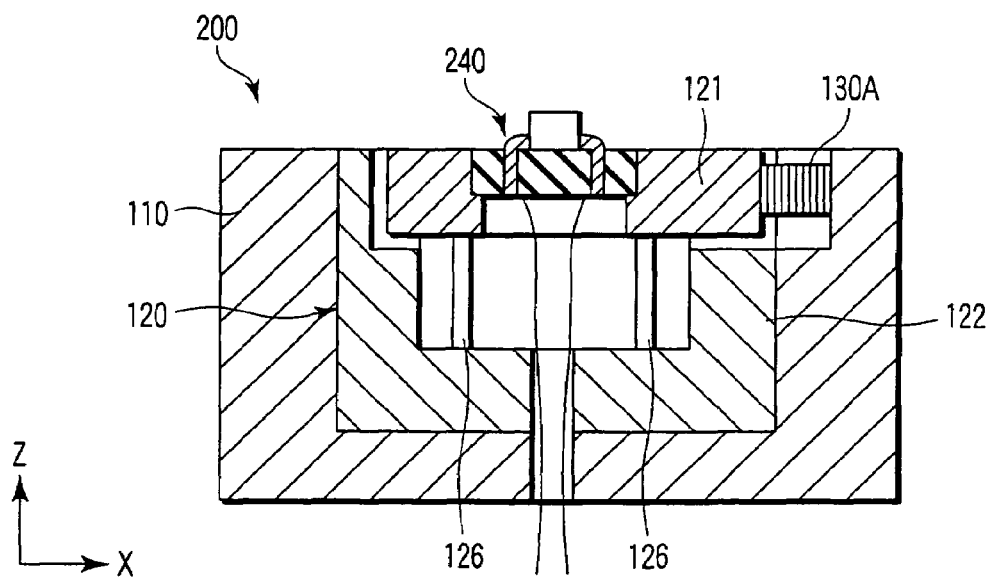
FIG. 9 is a sectional view taken along a line IX-IX of the scanning mechanism shown in FIG. 8.

FIG. 8 is a top view of a scanning mechanism according to the second embodiment of the present invention. FIG. 9 is a sectional view taken along a line IX-IX of the scanning mechanism shown in FIG. 8. The same reference numerals as in FIGS. 1 and 2 denote the same parts in FIGS. 8 and 9, and a detailed description thereof will be omitted.

As shown in FIGS. 8 and 9, a scanning mechanism 200 according to this embodiment has another Z stage 240 in place of the Z stage 140 in the first embodiment. Other arrangements are the same as those of the first embodiment.

FIG. 10 is a top view of the Z stage shown in FIGS. 8 and 9. FIG. 11 is a sectional view taken along a line XI-XI of the Z stage shown in FIG. 10.

As shown in FIGS. 10 and 11, the Z stage 240 includes an insulating board 242 housed in the large-diameter portion of the through hole in the movable portion 121, a Z-direction moving piezoelectric element 241 constituting a Z-direction moving actuator, a pair of conductive patterns 243 provided for the insulating board 242, wires 246 electrically connected to the conductive patterns 243, respectively, and electrical connecting portions 244 electrically connecting the Z-direction moving piezoelectric element 241 and the conductive patterns 243, respectively.

The Z-direction moving piezoelectric element 241 is mechanically fixed to the upper surface of the insulating board 242 with an adhesive or the like, and extends upward from the insulating board 242 along the Z-axis. An object to be moved is mounted on the free end of the Z-direction moving piezoelectric element 241. The object is, for example, a sample to be observed. In another case, the object is a cantilever. The Z-direction moving piezoelectric element 241 may have a weight of 1 [g] or less. The Z-direction moving piezoelectric element 241 comprises, for example, a stacked piezoelectric element, and expands and contracts along the Z-axis in accordance with the applied voltage. The central axis of the Z-direction moving piezoelectric element 241 passes through the center of gravity of the movable portion 121.

The insulating board 242 has through holes 245 formed on both sides of the Z-direction moving piezoelectric element 241. The conductive patterns 243 extend through the through holes 245 and expand around the through holes 245 on the upper and lower surfaces of the insulating board 242.

The electrical connecting portions 244 are provided at the lower end, i.e., the fixed end, of the Z-direction moving piezoelectric element 241, and are in contact with the Z-direction moving piezoelectric element 241 and the conductive patterns 243. The electrical connecting portions 244 individually may be, for example, a conductive paste, a conductive adhesive, an extra fine wire such as a bonding wire, or solder that melts at a low temperature. In addition, the electrical connecting portions 244 individually may be coated with graphite.

The wires 246 are connected to the conductive patterns 243 on the lower surface side of the insulating board 242. The wires 246 may be connected to the conductive patterns 243 by ordinary soldering before the formation of the electrical connecting portions 244. Therefore, the Z-direction moving piezoelectric element 241 is electrically connected to the wires 246 through the electrical connecting portions 244 and the conductive patterns 243.

When the electrical connecting portions 244 are formed from a conductive paste or a conductive adhesive, the wires 246 may be connected to the conductive patterns 243 by filling the through holes 245 with a conductive paste or a conductive adhesive. In this case, the Z-direction moving piezoelectric element 241 is electrically connected to the wires 246 through the electrical connecting portions 244.

The surfaces of the electrical connecting portions 244 are preferably covered with insulating films to prevent electrical leak and electrical shock.

This embodiment has the merit of eliminating the necessity of insulating films on the conductive patterns 243 in addition to the merits of the first embodiment.

Third Embodiment

This embodiment is directed to another scanning mechanism. The embodiment will be described below with reference to FIGS. 12 to 15.

Figure 12:
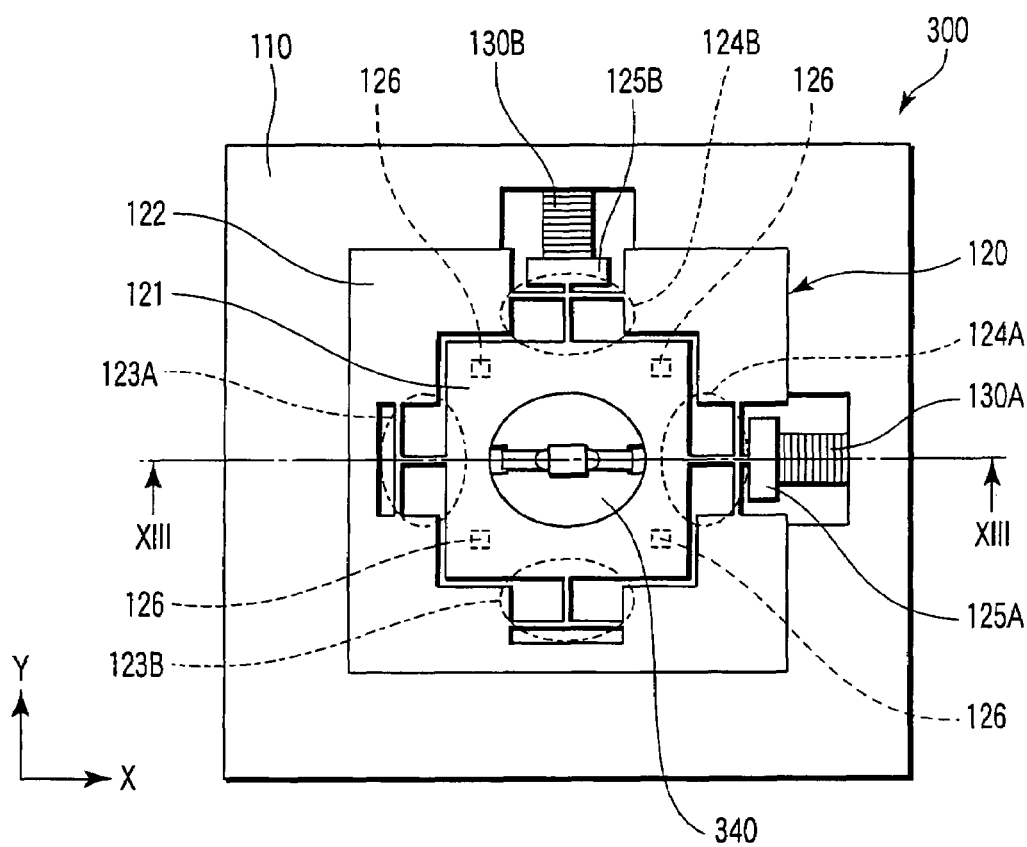
FIG. 12 is a top view of a scanning mechanism according to the third embodiment of the present invention.
Figure 13:
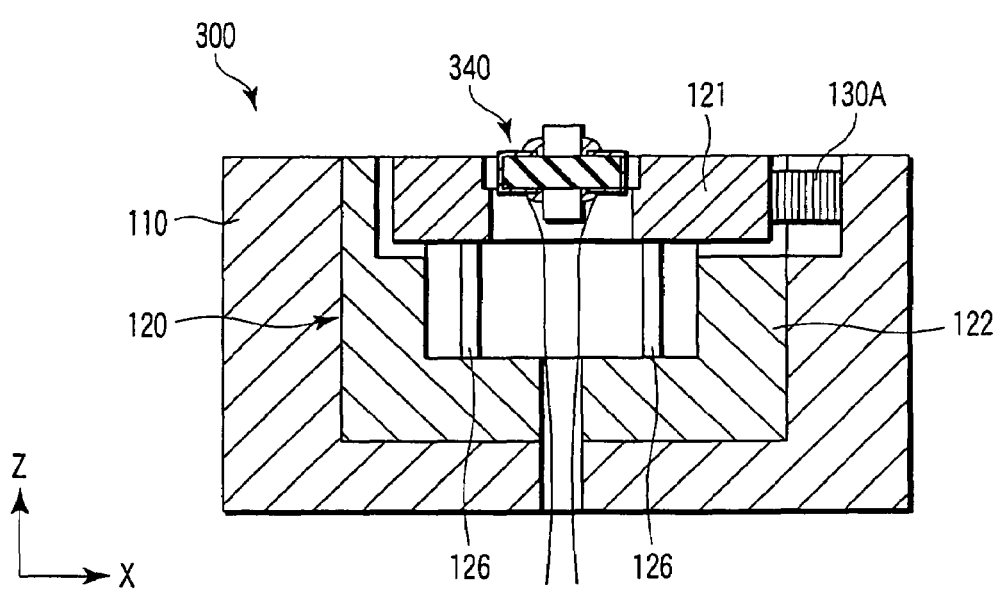
FIG. 13 is a sectional view taken along a line XIII-XIII of the scanning mechanism shown in FIG. 12.

FIG. 12 is a top view of the scanning mechanism according to the third embodiment of the present invention. FIG. 13 is a sectional view taken along a line XIII-XIII of the scanning mechanism shown in FIG. 12. The same reference numerals as in FIGS. 1 and 2 denote the same parts in FIGS. 12 and 13, and a detailed description thereof will be omitted.

As shown in FIGS. 12 and 13, a scanning mechanism 300 of this embodiment has another Z stage 340 in place of the Z stage 140 in the first embodiment. Other arrangements are the same as those in the first embodiment.

Figure 14:
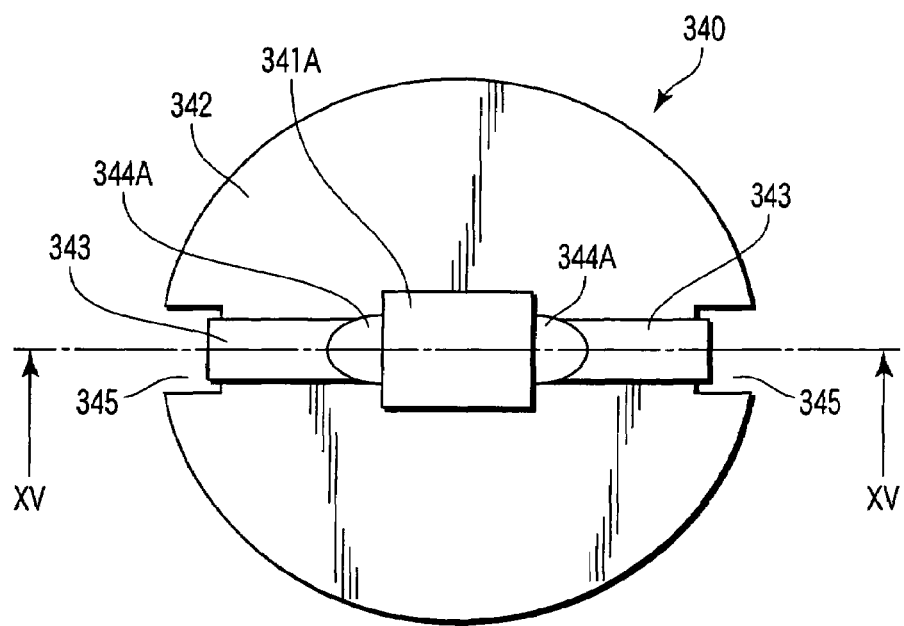
FIG. 14 is a top view of the Z stage shown in FIGS. 12 and 13.
Figure 15:
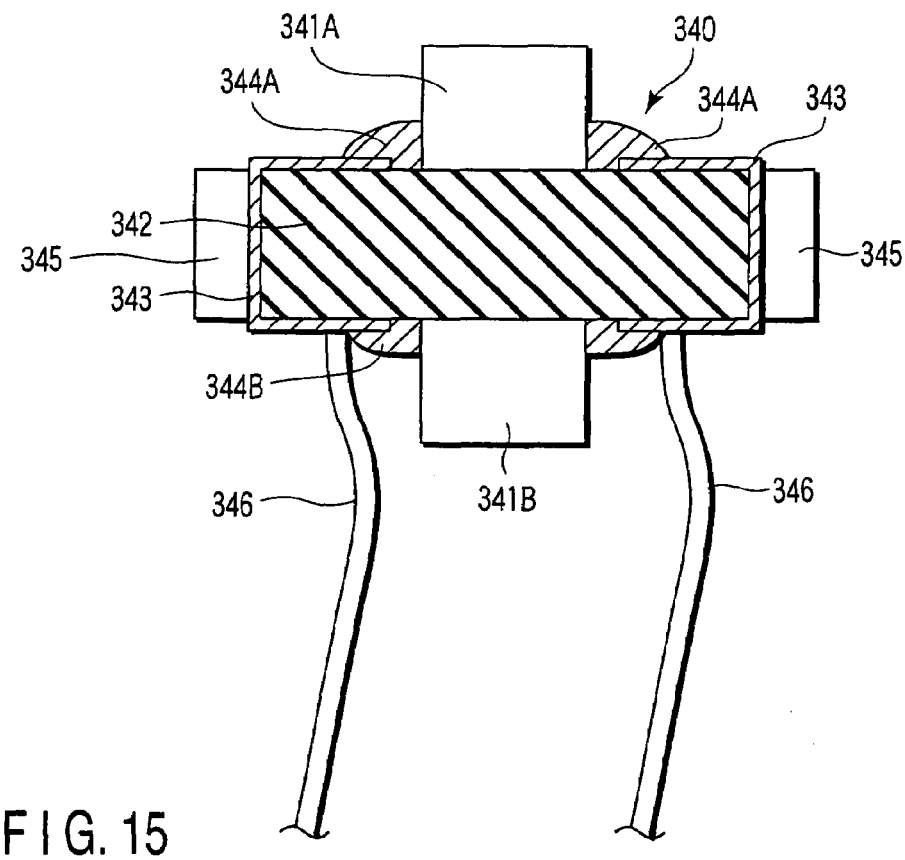
FIG. 15 is a sectional view taken along a line XIV-XIV of the Z stage shown in FIG. 14.

FIG. 14 is a top view of the Z stage shown in FIGS. 12 and 13. FIG. 15 is a sectional view taken along a line XIV-XIV of the Z stage shown in FIG. 14.

As shown in FIGS. 14 and 15, the Z stage 340 includes an insulating board 342 housed in the large-diameter portion of the through hole in the movable portion 121, a pair of Z-direction moving piezoelectric elements 341A and 341B constituting a Z-direction moving actuator, a pair of conductive patterns 343 provided for the insulating board 342, wires 346 electrically connected to the conductive patterns 343, respectively, and electrical connecting portions 344A and 344B electrically connecting the Z-direction moving piezoelectric elements 341A and 341B to the conductive patterns 343, respectively.

The two Z-direction moving piezoelectric elements 341A and 341B are mechanically fixed to the upper and lower surfaces of the insulating board 342, respectively, by an adhesive or the like, and extend coaxially from the insulating board 342 along the Z-axis to the opposite sides. The Z-direction moving piezoelectric elements 341A and 341B comprise, for example, stacked piezoelectric elements, and expand/contract along the Z-axis in accordance with the applied voltages. The central axis of the Z-direction moving piezoelectric elements 341A and 341B passes through the center of gravity of the movable portion 121.

The insulating board 342 has a pair of notches 345 formed on both sides of the insulating board 342 along the X-axis. Each of the conductive patterns 343 extends, from near the fixed end of the Z-direction moving piezoelectric element 341A, on the upper surface of the insulating board 342 outward along the X-axis, so as to extend from the upper surface of the insulating board 342 to the lower surface through the notch 345, and extends, on the lower surface of the insulating board 342 along the X-axis, to near the fixed end of the Z-direction moving piezoelectric element 341B.

The electrical connecting portions 344A are provided at the lower end, i.e., the fixed end, of the Z-direction moving piezoelectric element 341A, and are in contact with the Z-direction moving piezoelectric element 341A and the conductive patterns 343. The electrical connecting portions 344B are provided at the upper end, i.e., the fixed end, of the Z-direction moving piezoelectric element 341B, and are in contact with the Z-direction moving piezoelectric element 341B and the conductive patterns 343. The electrical connecting portions 344A and 344B individually may be, for example, a conductive paste, a conductive adhesive, an extra fine wire such as a bonding wire, or solder that melts at a low temperature. In addition, the electrical connecting portions 344A and 344B individually may be coated with graphite.

The wires 346 are connected to the conductive patterns 343 through the electrical connecting portions 344B. The Z-direction moving piezoelectric element 341A is electrically connected to the wires 346 through the electrical connecting portions 344A and the conductive patterns 343. The Z-direction moving piezoelectric element 341B is electrically connected to the wires 346 through the electrical connecting portions 344B.

An object to be moved is mounted on the free end of the upper Z-direction moving piezoelectric element 341A. The object is, for example, a sample to be observed. In another case, the object is a cantilever. If the mass of the object is large, a member having the same mass as that of the object is preferably mounted on the free end of the lower Z-direction moving piezoelectric element 341B.

At the time of Z scanning, the Z-direction moving piezoelectric elements 341A and 341B expand/contract in opposite directions along the Z-axis by the same amount. Therefore, the force applied to the movable portion 121 when the Z-direction moving piezoelectric element 341A expands and contracts and the force applied to the movable portion 121 when the Z-direction moving piezoelectric element 341B expands and contracts are equal in magnitude and are opposite in direction.

As the Z-direction moving piezoelectric element 341A expands and contracts, a Z-direction force is applied to the movable portion 121, so as to vibrate the movable portion 121. However, the Z-direction force applied to the movable portion 121 upon expansion/contraction of the Z-direction moving piezoelectric element 341A is canceled out by the expansion/contraction of the Z-direction moving piezoelectric element 341B. As a consequence, the movable portion 121 hardly vibrates.

In addition, since the central axes of the Z-direction moving piezoelectric elements 341A and 341B pass through the center of gravity of the movable portion 121, and third elastic support portions 126 are symmetrically arranged with respect to the straight line that passes through the center of gravity of the movable portion 121 and is parallel to the Z-axis, even if the Z-direction moving piezoelectric elements 341A and 341B are driven at a high speed, the upper surface of the movable portion 121 hardly tilts, so that high-accuracy operation is realized.

The scanning mechanism 300 of this embodiment has the merit of generating small vibrations in addition to the merits of the first embodiment.

Fourth Embodiment

This embodiment is directed to another Z stage that can be used in place of, for example, the Z stage in the first embodiment. The embodiment will be described below with reference to FIGS. 16 to 18.

Figure 16:
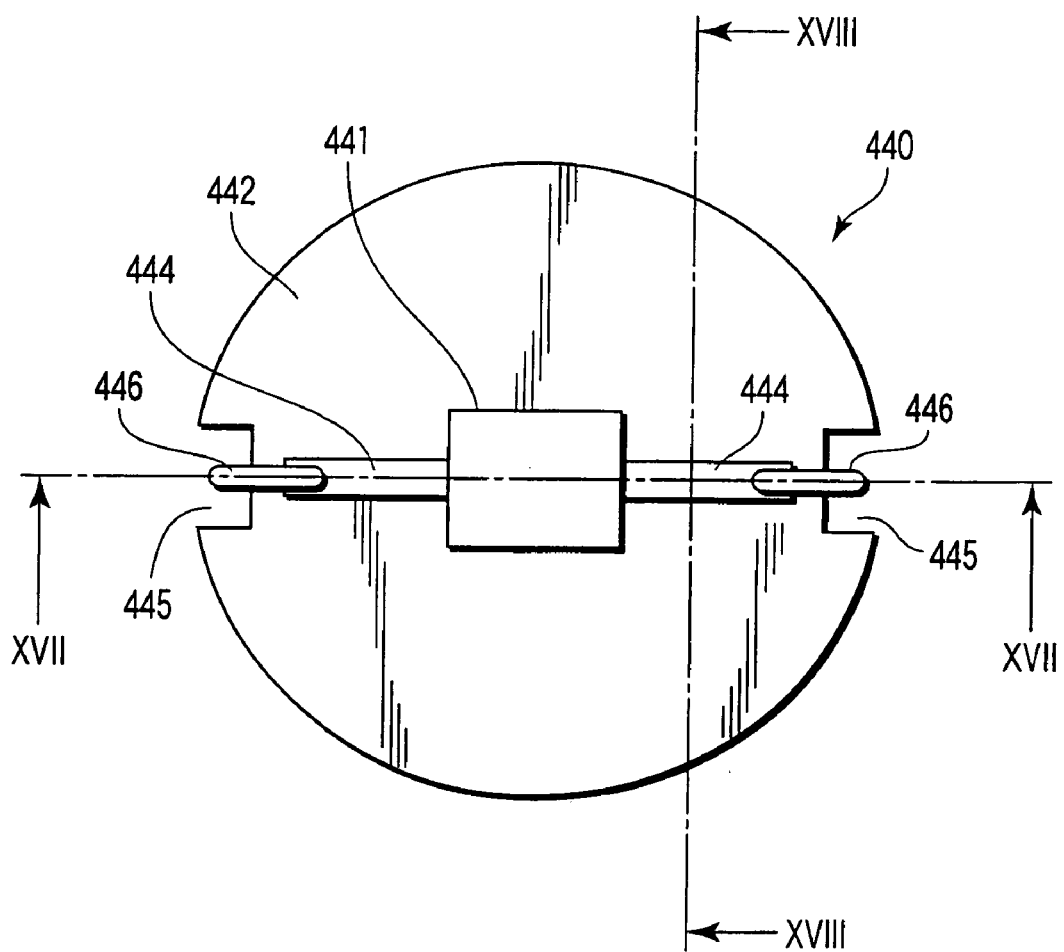
FIG. 16 is a top view of a Z stage according to this embodiment.
Figure 17:
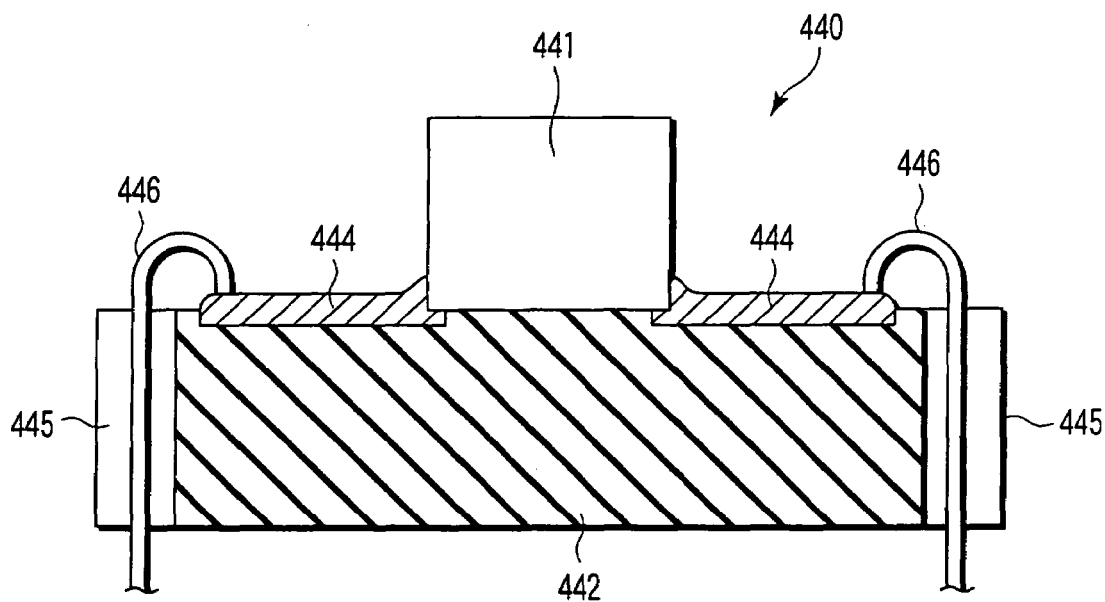
FIG. 17 is a sectional view taken along a line XVII-XVII of the Z stage shown in FIG. 16.
Figure 18:
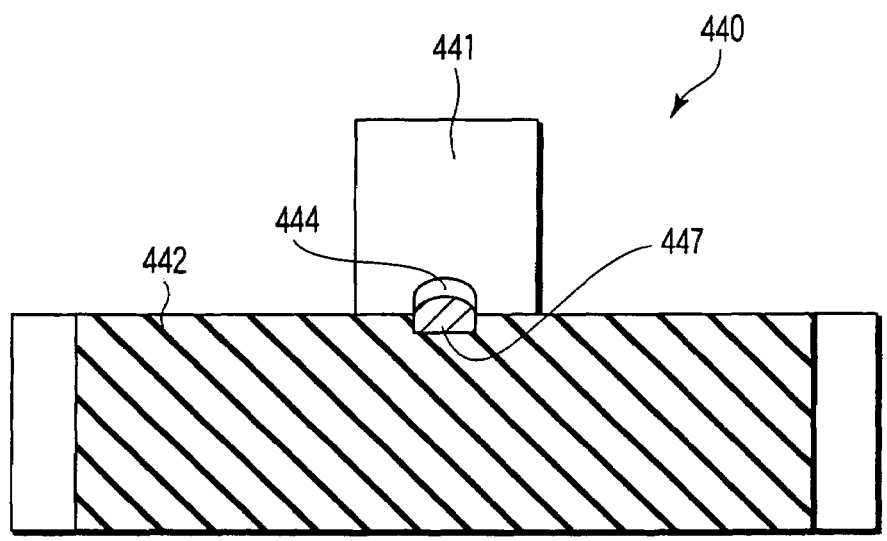
FIG. 18 is a sectional view taken along a line XVIII-XVIII of the Z stage shown in FIG. 16.

FIG. 16 is a top view of the Z stage according to this embodiment. FIG. 17 is a sectional view taken along a line XVII-XVII of the Z stage shown in FIG. 16. FIG. 18 is a sectional view taken along a line XVIII-XVIII of the Z stage shown in FIG. 16.

As shown in FIGS. 16 to 18, a Z stage 440 includes an insulating board 442 housed in the large-diameter portion of the through hole in the movable portion 121, a Z-direction moving piezoelectric element 441 constituting a Z-direction moving actuator, a pair of electrical connecting portions 444 provided for the insulating board 442, and wires 446 electrically connected to the electrical connecting portions 444.

The Z-direction moving piezoelectric element 441 is mechanically fixed to the upper surface of the insulating board 442 with an adhesive or the like, and extends from the insulating board 442 along the Z-axis. An object to be moved is mounted on the free end of the Z-direction moving piezoelectric element 441. The object is, for example, a sample to be observed. In another case, the object is a cantilever. The Z-direction moving piezoelectric element 441 comprises, for example, a stacked piezoelectric element, and expands and contracts along the Z-axis in accordance with the applied voltage. The central axis of the Z-direction moving piezoelectric element 441 passes through the center of gravity of the movable portion 121.

The electrical connecting portions 444 are provided in a pair of grooves 447 formed in the insulating board 442 to extend along the X-axis. The grooves 447 extend from the fixed end of the Z-direction moving piezoelectric element 441 to near notches 445. The electrical connecting portions 444 are in contact with the lower end, i.e., the fixed end, of the Z-direction moving piezoelectric element 441, and are electrically connected to the Z-direction moving piezoelectric element 441. In addition, the wires 446 are electrically connected to the electrical connecting portions 444. The Z-direction moving piezoelectric element 441 is therefore electrically connected to the wires 446 through the electrical connecting portions 444. The wires 446 extend downward through the notches 445 formed on both sides of the insulating board 442.

The electrical connecting portions 444 are formed by, for example, dropping a conductive paste or a conductive adhesive into the grooves 447 formed in the insulating board 442 and allowing it to harden. Since the conductive paste or conductive adhesive dropped in the grooves 447 easily expands along the grooves 447, the electrical connecting portions 444 that are in contact with the Z-direction moving piezoelectric element 441 with small areas can be easily formed.

According to the scanning mechanism of this embodiment, since the contact areas between the Z-direction moving piezoelectric element 441 and the electrical connecting portions 444 are small, the constraint of the Z-direction moving piezoelectric element 441 by the electrical connecting portions 444 is small. In addition to the merits of the first embodiment, therefore, this embodiment has a merit that deterioration in displacement characteristic due to the constraint of the Z-direction moving piezoelectric element 441 is small.

Fifth Embodiment

This embodiment is directed to another scanning mechanism. The embodiment will be described below with reference to FIGS. 19 to 21.

Figure 19:
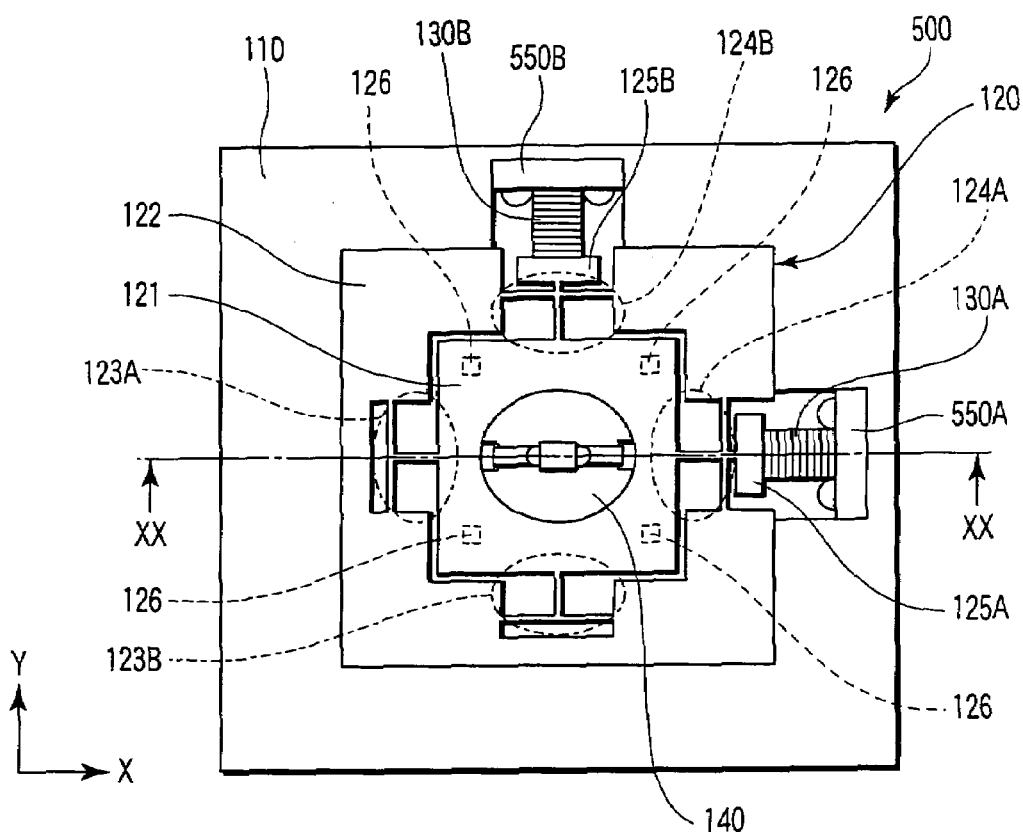
FIG. 19 is a top view showing a scanning mechanism according to the fifth embodiment of the present invention.
Figure 20:
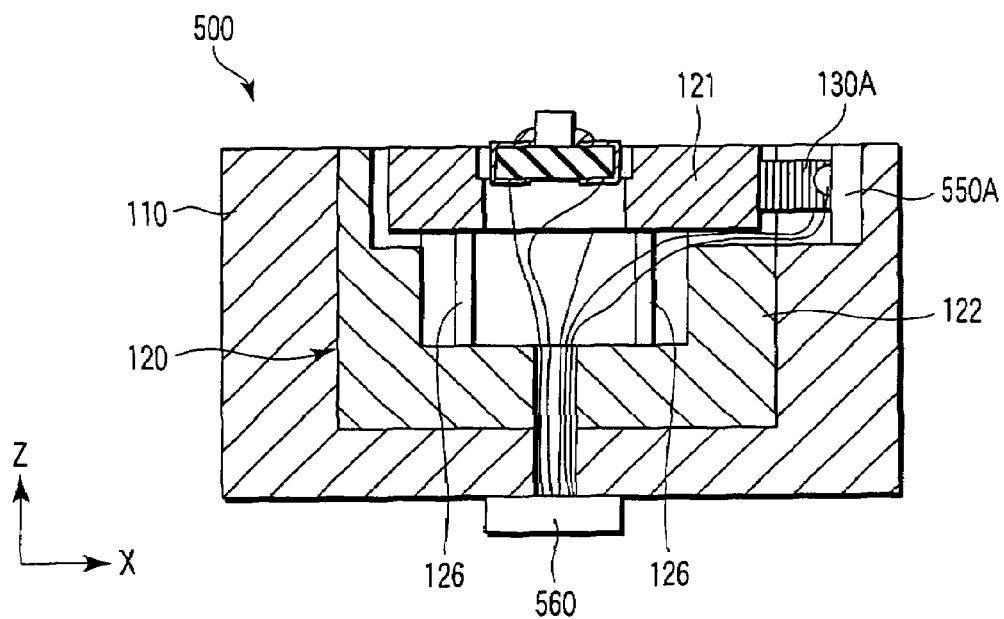
FIG. 20 is a sectional view taken along a line XX-XX of the scanning mechanism shown in FIG. 19.

FIG. 19 is a top view of the scanning mechanism according to the fifth embodiment of the present invention. FIG. 20 is a sectional view taken along a line XX-XX of the scanning mechanism shown in FIG. 19. The same reference numerals as in FIGS. 1 and 2 denote the same parts in FIGS. 19 and 20, and a detailed description thereof will be omitted.

As shown in FIGS. 19 and 20, a scanning mechanism 500 according to this embodiment includes a fixed base 550A to which the X-direction moving actuator 130A is fixed and a fixed base 550B to which the Y-direction moving actuator 130B is fixed, in addition to the arrangement of the first embodiment. That is, the X-direction moving actuator 130A is fixed to the fixed base 550A fixed to the fixed base 110. Likewise, the Y-direction moving actuator 130B is fixed to the fixed base 550B fixed to the fixed base 110. Other arrangements are the same as those of the first embodiment.

Figure 21:
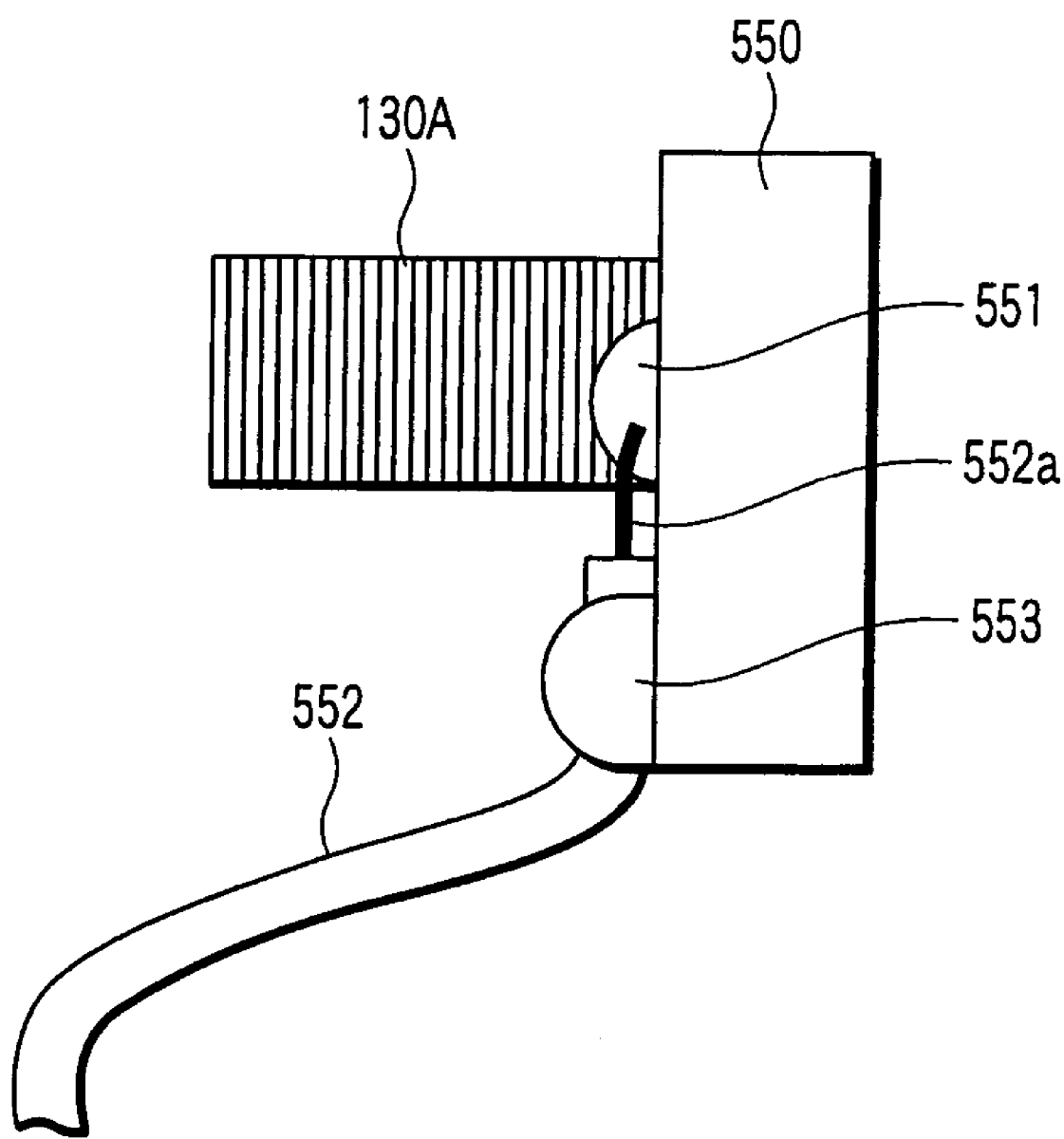
FIG. 21 is a side view of an X-direction moving actuator and its fixed base shown in FIGS. 19 and 20.

The fixed bases 550A and 550B have the same arrangement, and the fixed base 550A will be representatively described below. FIG. 21 is a side view of the X-direction moving actuator and its fixed base shown in FIGS. 19 and 20.

As shown in FIG. 21, the fixed base 550A comprises an insulating member. Wire 552 are fixed to the fixed base 550A with adhesives 553. Wire rods 552a of the wires 552 are electrically connected to the X-direction moving actuator 130A through electrical connecting portions 551. Since the wires 552 are fixed to the fixed base 550A, the X-direction moving actuator 130A receives no load produced by the wires 552.

The same applies to a Y-direction moving actuator 130B.

As shown in FIG. 20, a connector 560 is fixed to the lower surface of the fixed base 110. All wires electrically connected to the X-direction moving actuator 130A, the Y-direction moving actuator 130B, and a Z-direction moving piezoelectric element 141 are connected to the connector 560 fixed to the fixed base 110 through a through hole formed in a fixed portion 122 and the fixed base 110. The connector 560 is electrically connected to, for example, an external device such as an external power supply. That is, the X-direction moving actuator 130A, the Y-direction moving actuator 130B, and the Z-direction moving piezoelectric element 141 are electrically connected to the external device through the connector 560.

The scanning mechanism 500 of this embodiment can be easily detached from the external device at the connector 560. If, therefore, any one of the X-direction moving actuator 130A, the Y-direction moving actuator 130B, and the Z-direction moving piezoelectric element 141 fails for some reason, the scanning mechanism can be easily replaced with another scanning mechanism 500 whose operation is guaranteed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scanning probe microscope scanning mechanism for moving an object to be moved along a Z-axis, comprising:
    a Z stage to move the object along the Z-axis, wherein the Z stage comprises an insulating board, a Z-direction moving actuator fixed to the insulating board, a conductive pattern for the insulating board, and an electrical connecting portion to electrically connect the conductive pattern to the Z-direction moving actuator;
    wherein the object is mounted on a free end of the Z-direction moving actuator, and the electrical connecting portion is attached at a fixed end of the Z-direction moving actuator.

2. A mechanism according to claim 1, further comprising:
    a fixed base;
    an X-Y stage, housed in the fixed base, to move the object alone an X-axis and a Y-axis that are perpendicular to each other and to the Z-axis;
    an X-direction moving actuator extending along the X-axis between the X-Y stage and the fixed base; and
    a Y-direction moving actuator extending along the Y-axis between the X-Y stage and the fixed base,
    wherein the X-Y stage comprises: a movable portion that is movable along the X-axis and the Y-axis, a fixed portion located around the movable portion, a pair of first elastic support portions that are located on both sides of the movable portion along the X-axis and that connect the movable portion and the fixed portion, a pair of second elastic support portions that are located on both sides of the movable portion along the Y-axis and that connect the movable portion and the fixed portion, and a third elastic support portion that is located on one side of the movable portion along the Z-axis and that connects the movable portion and the fixed portion,
    wherein the X-direction moving actuator extends in contact with the first elastic support portions and the fixed base and is capable of expanding and contracting along the X-axis, and the Y-direction moving actuator extends in contact with the second elastic support portions and the fixed base and is capable of expanding and contracting along the Y-axis, and wherein the insulating board of the Z-stage is held on the movable portion of the X-Y stage.

3. A mechanism according to claim 1, wherein the electrical connecting portion comprises a conductive paste.

4. A mechanism according to claim 1, wherein the electrical connecting portion comprises a conductive adhesive.

5. A mechanism according to claim 1, wherein the electrical connecting portion comprises solder that melts at a low temperature.

6. A mechanism according to claim 1, wherein the insulating board comprises a material having a Young's modulus larger than $7 \times 10^9$ Pa.

7. A mechanism according to claim 1, wherein the insulating board comprises a ceramic material.

8. A mechanism according to claim 1, wherein the Z-direction moving actuator comprises two piezoelectric elements which can expand and contract along the Z-axis, and which are located coaxially and respectively extend from the insulating board to opposite sides along the Z-axis.

9. A mechanism according to claim 1, wherein the object comprises a sample to be observed.

10. A mechanism according to claim 1, wherein the object comprises a cantilever.

11. A scanning probe microscope comprising the scanning mechanism according to claim 1.

12. A mechanism according to claim 1, wherein the Z-direction moving actuator comprises a piezoelectric actuator.

13. A mechanism according to claim 12, wherein a contact area between the electrical connecting portion and the piezoelectric element is not more than ½ an area of a surface of the piezoelectric element that is in contact with the electrical connecting portion.

14. A mechanism according to claim 12, wherein the piezoelectric element has a mass of not more than 1 g.

* * * * *